United States Patent
Kang

(10) Patent No.: US 10,439,174 B2
(45) Date of Patent: Oct. 8, 2019

(54) SECONDARY BATTERY

(71) Applicant: Samsung SDI Co., Ltd., Yongin-si, Gyeonggi-do (KR)

(72) Inventor: Shingun Kang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 133 days.

(21) Appl. No.: 15/357,926

(22) Filed: Nov. 21, 2016

(65) Prior Publication Data

US 2017/0149027 A1 May 25, 2017

(30) Foreign Application Priority Data

Nov. 20, 2015 (KR) .................. 10-2015-0163336

(51) Int. Cl.
*H01M 2/06* (2006.01)
*H01M 2/02* (2006.01)
*H01M 10/04* (2006.01)

(52) U.S. Cl.
CPC ........... *H01M 2/06* (2013.01); *H01M 2/0207* (2013.01); *H01M 2/0237* (2013.01); *H01M 10/04* (2013.01); *H01M 10/0431* (2013.01); *H01M 2220/20* (2013.01); *H01M 2220/30* (2013.01)

(58) Field of Classification Search
CPC ............ H01M 10/04; H01M 10/0431; H01M 2220/20; H01M 2220/30; H01M 2/0207; H01M 2/0237; H01M 2/06
See application file for complete search history.

(56) References Cited

U.S. PATENT DOCUMENTS

| | | | |
|---|---|---|---|
| 8,133,609 B2 | 3/2012 | Kim et al. | |
| 2012/0015216 A1* | 1/2012 | Park | H01M 2/1061 |
| | | | 429/7 |
| 2013/0189561 A1* | 7/2013 | Kim | H01M 2/14 |
| | | | 429/144 |

FOREIGN PATENT DOCUMENTS

| | | |
|---|---|---|
| JP | 2006-032018 A | 2/2006 |
| JP | 2008-171726 A | 7/2008 |
| KR | 10-2003-0096717 A | 12/2003 |

* cited by examiner

*Primary Examiner* — Sarah A. Slifka
*Assistant Examiner* — Victoria H Lynch
(74) *Attorney, Agent, or Firm* — Knobbe Martens Olson & Bear LLP

(57) ABSTRACT

A secondary battery is disclosed. The battery includes an electrode assembly comprising a curved surface on at least one side thereof and a frame surrounding the electrode assembly. The frame includes an accommodating curved surface facing the accommodating curved surface of the electrode assembly.

16 Claims, 8 Drawing Sheets

SECONDARY BATTERY

CROSS-REFERENCE TO RELATED APPLICATION

This application claims the benefit of Korean Patent Application No. 10-2015-0163336, filed on Nov. 20, 2015, in the Korean Intellectual Property Office, the disclosure of which is incorporated herein in its entirety by reference.

BACKGROUND

Field

The described technology generally relates to a rechargeable secondary battery.

Description of the Related Technology

The usage of secondary batteries as power sources has markedly increased along with the advancement of technology for mobile devices, such as cellular phones or laptop computers, and the increased production of these devices. Recently, much research has been conducted into developing secondary batteries for electric or hybrid vehicles as substitutes for fossil fuels.

During the assembly of the secondary batteries, testing (such as drop tests or vibration tests), product distribution and usage, the batteries are exposed to damage caused by impacts.

SUMMARY OF CERTAIN INVENTIVE ASPECTS

One inventive aspect relates to a secondary battery configured to prevent wobbling of an electrode assembly and protect a case accommodating the electrode assembly.

Another aspect is a secondary battery that includes: an electrode assembly including a curved surface on at least one side thereof; and a frame surrounding the electrode assembly and including a complementarily curved surface facing the curved surface of the electrode assembly.

The electrode assembly can include: a first side from which a lead member extends outward; a second side opposite the first side; and third and fourth sides extending in parallel with each other between the first and second sides, the third and fourth sides including curved surfaces, wherein the frame can cover the curved surfaces of the third and fourth sides.

The electrode assembly can have a rectangular shape with a pair of long sides and a pair of short sides, and the third and fourth sides can be the long sides.

The frame can include a first frame, a second frame, and third frames covering different portions of the electrode assembly and arranged in a direction in which the lead member extends outward.

The first frame can cover the first side of the electrode assembly, the second frame can cover the second side of the electrode assembly, and the third frames can cover the third and fourth sides of the electrode assembly.

The first frame can include a tab hole through which the lead member is inserted.

The first frame can extend to the third and fourth sides across the first side, and the first frame can neighbor the third frames along the third and fourth sides.

The second frame can extend to the third and fourth sides across the second side, and the second frame can neighbor the third frames along the third and fourth sides.

The first frame can be spaced apart from the third and fourth frames, or the second frame can be spaced apart from the third and fourth frames.

The third frames can include a pair of third frames respectively covering the third and fourth sides of the electrode assembly.

The pair of third frames can be separate from each other.

The secondary battery can further include a case accommodating the electrode assembly, wherein the frame can be disposed between the electrode assembly and the case.

The case can include a flexible pouch.

Another aspect is a secondary battery that includes: an electrode assembly; a frame surrounding the electrode assembly and including installation depressions; and fixing members folded along the installation depressions to surround the installation depressions and the electrode assembly.

The installation depressions can be formed by recessing walls of the frame by an amount equal to or greater than a thickness of the fixing members.

The installation depressions can include rest parts rounded in directions in which the fixing members are folded.

The electrode assembly can include: a first side from which a lead member extends outward; a second side opposite the first side; and third and fourth sides extending in parallel with each other between the first and second sides, wherein the fixing members can be folded along sides of the frame covering the third and fourth sides.

The electrode assembly can have a rectangular shape with a pair of long sides and a pair of short sides, and the third and fourth sides can be the long sides.

The frame can include a first frame, a second frame, and third frames covering different portions of the electrode assembly and arranged in a direction in which the lead member extends outward.

The first frame can cover the first side of the electrode assembly, the second frame can cover the second side of the electrode assembly, and the third frames can be provided as a pair respectively covering the third and fourth sides of the electrode assembly, wherein the installation depressions can be provided as a pair at opposite positions of the third frames provided as a pair.

Another aspect is a secondary battery comprising: an electrode assembly comprising a curved surface on at least one side thereof; and a frame surrounding the electrode assembly and comprising an accommodating curved surface facing the accommodating curved surface of the electrode assembly.

In the above secondary battery, the electrode assembly comprises: a first side from which a lead member extends outwardly; a second side opposite the first side; and third and fourth sides extending in parallel with each other between the first and second sides, the third and fourth sides comprising curved surfaces, and wherein the frame covers the curved surfaces of the third and fourth sides.

In the above secondary battery, the electrode assembly has a substantially rectangular shape, and the third and fourth sides are longer than the first and second sides.

In the above secondary battery, the frame comprises a first frame, a second frame, and a pair of third frames covering different portions of the electrode assembly.

In the above secondary battery, the first frame covers the first side of the electrode assembly, wherein the second frame covers the second side of the electrode assembly, and wherein the third frames cover the third and fourth sides of the electrode assembly.

In the above secondary battery, the first frame has a tab hole through which the lead member passes.

In the above secondary battery, the first frame extends to the third and fourth sides of the electrode assembly across the first side of the electrode assembly, wherein the first frame neighbors the third frames along the third and fourth sides of the electrode assembly.

In the above secondary battery, the second frame extends to the third and fourth sides of the electrode assembly across the second side of the electrode assembly, wherein the second frame neighbors the third frames along the third and fourth sides of the electrode assembly.

In the above secondary battery, i) the first frame is spaced apart from the third and fourth frames and/or ii) the second frame is spaced apart from the third and fourth frames.

In the above secondary battery, the third frames respectively cover the third and fourth sides of the electrode assembly.

In the above secondary battery, the third frames are separate from each other.

The above secondary battery further comprises a case accommodating the electrode assembly, wherein the frame is disposed between the electrode assembly and the case.

In the above secondary battery, the case comprises a flexible pouch.

In the above secondary battery, the frame comprises a plurality of rest parts, wherein the secondary battery comprises a plurality of fixing members folded along the rest parts and surrounding the rest parts and portions of the electrode assembly.

Another aspect is a secondary battery comprising: an electrode assembly; a frame surrounding the electrode assembly and comprising a plurality of rest parts; and a plurality of fixing members folded along the rest parts and surrounding the rest parts and portions of the electrode assembly.

In the above secondary battery, the thicknesses of the rest parts are substantially equal to or greater than the thickness of the respective fixing member.

In the above secondary battery, the rest parts have a curved shape, and the fixing members are folded around the rest parts.

In the above secondary battery, the electrode assembly comprises: a first side from which a lead member extends outwardly; a second side opposite the first side; and third and fourth sides extending in parallel with each other between the first and second sides, wherein the frame includes a plurality of portions covering the third and fourth sides, and wherein the fixing members are folded around the portions of the frame.

In the above secondary battery, the electrode assembly has a substantially rectangular shape, and the third and fourth sides are longer than the first and second sides.

In the above secondary battery, the frame comprises a first frame, a second frame, and a pair of third frames covering different portions of the electrode assembly.

In the above secondary battery, the first frame covers the first side of the electrode assembly, wherein the second frame covers the second side of the electrode assembly, and wherein the third frames respectively cover the third and fourth sides of the electrode assembly, and wherein the rest parts are formed around the third frames.

DETAILED DESCRIPTION OF CERTAIN INVENTIVE EMBODIMENTS

Figure 1:
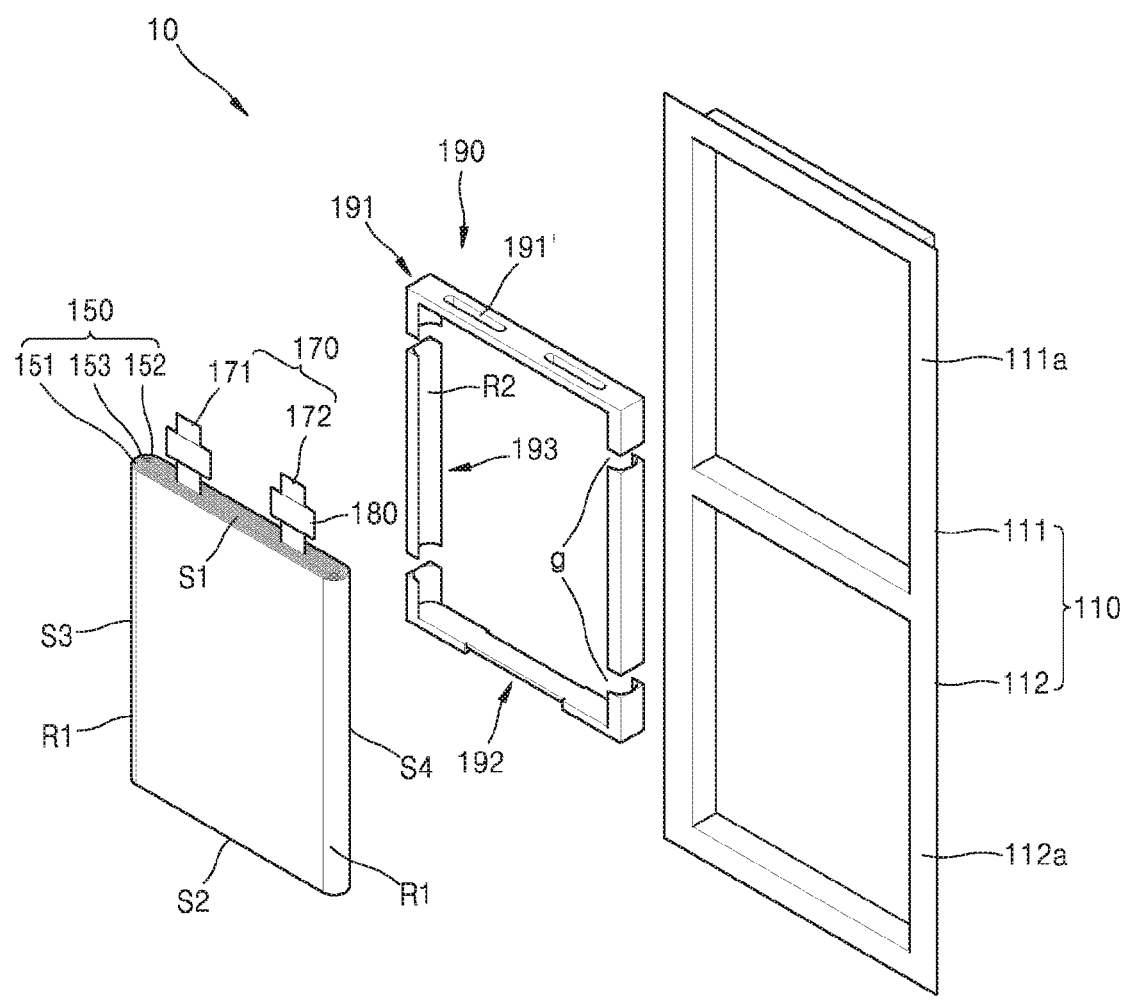
FIGS. 1 and 2 are views illustrating a secondary battery according to an exemplary embodiment.

Reference will now be made in detail to exemplary embodiments, examples of which are illustrated in the accompanying drawings, wherein like reference numerals refer to like elements throughout. In this regard, the present exemplary embodiments can have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

Secondary batteries will now be described with reference to the accompanying drawings, in which exemplary embodiments are shown.

Figure 2:
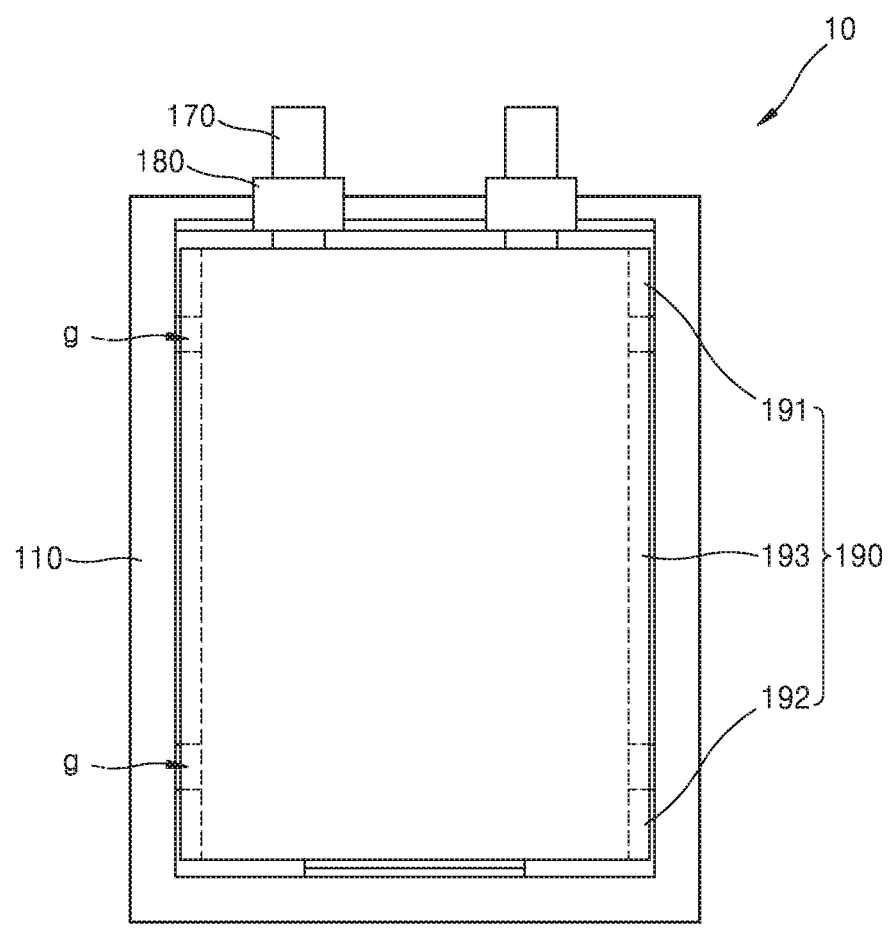
Figure 3:
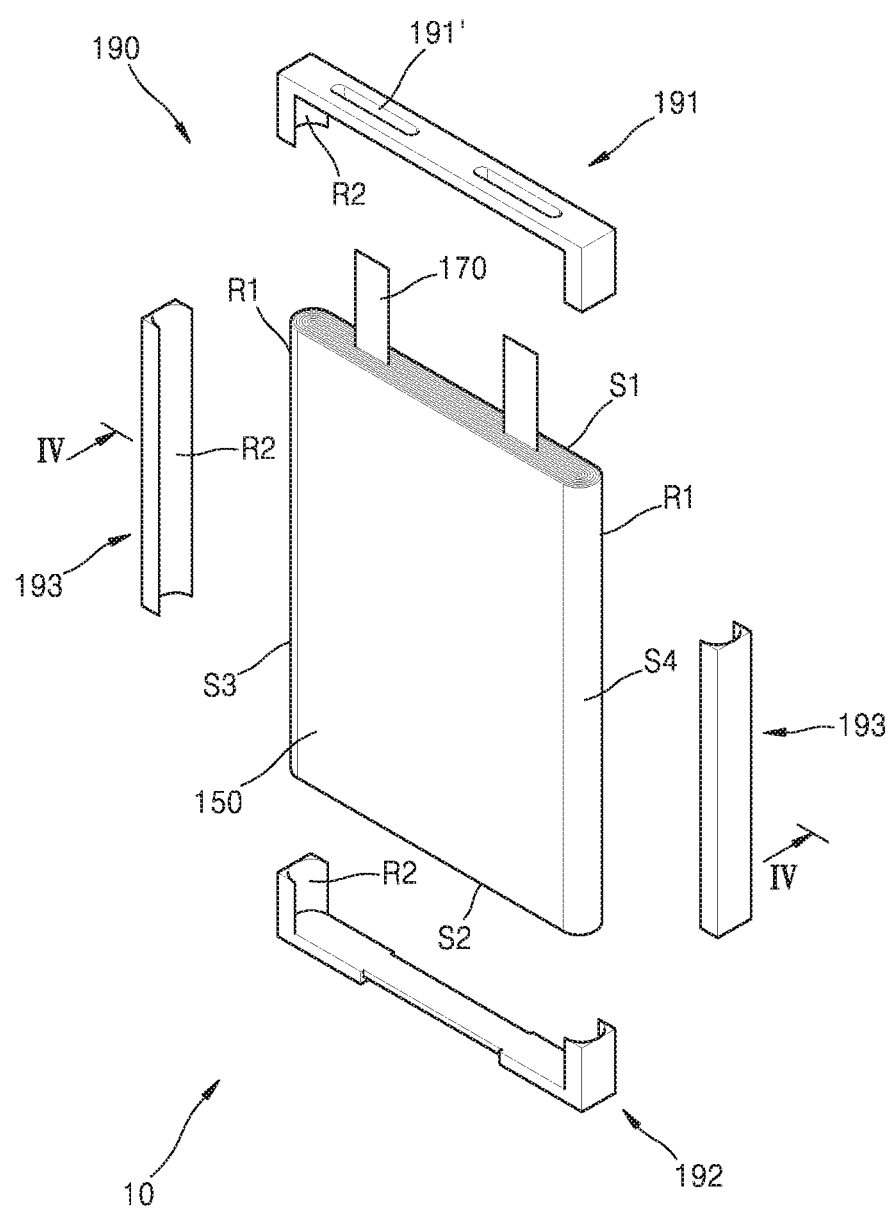
FIG. 3 is an exploded perspective view illustrating a portion of the secondary battery depicted in FIG. 1.
Figure 4:
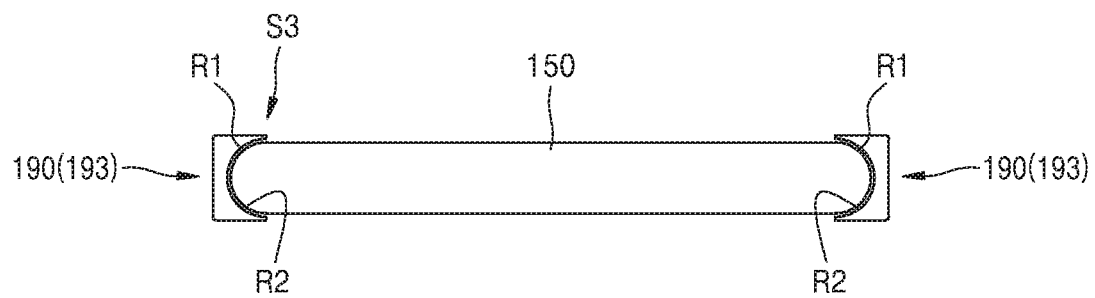
FIG. 4 is a cross-sectional view taken along line VI-VI of FIG. 3.
Figure 5:
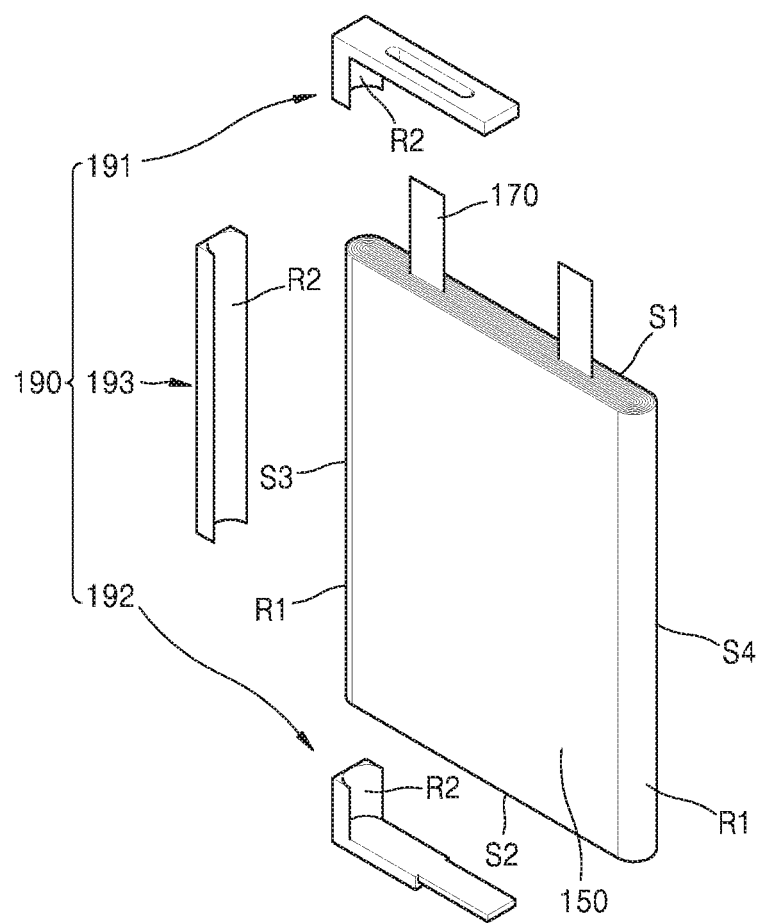
FIG. 5 is a view illustrating a frame surrounding an electrode assembly.

FIGS. 1 and 2 are views illustrating a secondary battery 10 according to an exemplary embodiment. FIG. 3 is an exploded perspective view illustrating a portion of the secondary battery 10 depicted in FIG. 1. FIG. 4 is a cross-sectional view taken along line VI-VI of FIG. 3. FIG. 5 is a view illustrating a frame 190 surrounding an electrode assembly 150.

Referring to FIGS. 1 and 2, the secondary battery 10 includes the electrode assembly 150, the frame 190 surrounding the electrode assembly 150, and a case 110 accommodating the electrode assembly 150 and the frame 190.

The electrode assembly 150 can include first and second electrode plates 151 and 152 having different polarities, and a separator 153 interposed between the first and second electrode plates 151 and 152. For example, the electrode assembly 150 is formed by disposing the separator 153 between the first and second electrode plates 151 and 152 and winding the electrode plates 151 and 152 and the separator 153 in the form of a jelly-roll. In another exemplary embodiment, however, the electrode assembly 150 is formed as a stacked-type electrode assembly by stacking the first and second electrode plates 151 and 152 with the separator 153 being disposed therebetween.

The electrode assembly 150 can include a first side S1 from which lead members 170 extend outward, a second side S2 located opposite the first side S1, and third and fourth sides S3 and S4 extending in parallel with each other between the first and second sides S1 and S2. The third and fourth sides S3 and S4 can have a curved shape.

The electrode assembly 150 can have a substantially rectangular shape with a pair of long sides and a pair of short sides, and the third and fourth sides S3 and S4 corresponding to the long sides can have surfaces R1 curved in a round shape. As described later, the frame 190 can have curved surfaces R2 covering the third and fourth sides S3 and S4.

For example, the case 110 includes a first case 111 and a second case 112. The first and second cases 111 and 112 can be jointed together in mutually facing directions with the electrode assembly 150 being disposed therebetween. Sealing portions 111a and 112a can be formed along mutually-facing edges of the first and second cases 111 and 112. For example, the first and second cases 111 and 112 accommodate the electrode assembly 150 and then are joined together in mutually-facing directions. Also, the sealing portions 111a and 112a of the first and second cases 111 and 112 can be thermally bonded so as to seal the electrode assembly 150 accommodated in the first and second cases 111 and 112.

The case 110 can be a flexible pouch. Although not shown in FIGS. 1 and 2, the case 110 can be a flexible case formed of a thin metal sheet with an insulating material on both sides. That is, the case 110 can be a pouch-type case configured to hermetically accommodate the electrode assembly 150.

The lead members 170 can extend from the electrode assembly 150. For example, the lead members 170 include first and second lead members 171 and 172 electrically connected to the first and second electrode plates 151 and 152, respectively. The lead members 170 can extend to the outside of the case 110 to form a charge-discharge current path. Insulation members 180 can be disposed around the lead members 170. For example, the insulation members 180 are disposed around the lead members 170 at positions facing the case 110 so as to insulate the lead members 170 from the case 110 and seal gaps between the case 110 and the lead members 170.

Referring to FIG. 2, the frame 190 can be disposed between the electrode assembly 150 and the case 110. For example, the frame 190 fills a space between the electrode assembly 150 and the case 110 and can thus prevents the electrode assembly 150 from wobbling. If the electrode assembly 150 wobbles, the electrode assembly 150 can tear or become damaged, and the case 110 having flexibility can wrinkle. If the case 110 wrinkles, assembly errors can occur when the case 110 is coupled to a pack case (not shown) and a circuit board (not shown) in a packing process, or the case 110 can be chopped or stabbed by an assembly jig (not shown). Furthermore, since the frame 190 fills the space between the electrode assembly 150 and the case 110, when the case 110 is sealed, wrinkling of the case 110 caused by a pressure difference can be prevented.

An electrolyte can be filled in the case 110 together with the electrode assembly 150. In this case, since the frame 190 fills the space between the case 110 and the electrode assembly 150, the case 110 can be filled with a relatively small amount of electrolyte.

Referring to FIGS. 3 to 5, the frame 190 surrounds the electrode assembly 150. For example, the electrode assembly 150 has a curved surface R1 on at least one side thereof, and the frame 190 has an accommodating or corresponding curved surface R2 facing the curved surface R1 and accommodating the curved surface R1. That is, the curved surface R2 of the frame 190 can match the curved surface R1 of the electrode assembly 150.

The electrode assembly 150 can include the first side S1 from which the lead members 170 extend outward, the second side S2 located opposite the first side S1, and the third and fourth sides S3 and S4 extending in parallel with each other between the first and second sides S1 and S2. The third and fourth sides S3 and S4 can have a curved shape. For example, the electrode assembly 150 has a substantially rectangular shape with a pair of long sides and a pair of short sides, and the third and fourth sides S3 and S4 corresponding to the long sides have surfaces R1 curved in a round shape. In this case, the frame 190 can have curved surfaces R2 covering the third and fourth sides S3 and S4.

For example, inner surfaces of the frame 190 facing the third and fourth sides S3 and S4 have curved surfaces R2, and the curved surfaces R2 contact the third and fourth sides S3 and S4 or hold the third and fourth sides S3 and S4 from positions adjacent to the third and fourth sides S3 and S4.

The frame 190 can include the curved surfaces R2 matching the curved surfaces R1 (rounded surface) of the third and fourth sides S3 and S4 and can fill the space between the electrode assembly 150 and the case 110. Therefore, wobbling of the electrode assembly 150 and deformation of the case 110 having flexibility can be prevented, and the amount of electrolyte necessary to fill the case 110 can be reduced.

The frame 190 can be divided into parts. For example, the frame 190 can include first, second and third frames 191, 192, and 193. For example, the first, second, and third frames 191, 192, and 193 can correspond to three regions of the frame 190 defined according to a direction in which the lead members 170 extend outward. The first, second, and third frames 191, 192, and 193 can cover different portions of the electrode assembly 150 and can be arranged in the direction in which the lead members 170 extend outward.

In the direction in which the lead members 170 extend outward, the first frame 191 can be an upper part of the frame 190, and the second frame 192 can be a lower part of the frame 190. The third frames 193 can be middle parts of the frame 190.

As described later, the frame 190 can be manufactured by injecting a resin into molds. In this case, since the frame 190 is divided into three regions (parts), the frame 190 can easily be manufactured. That is, the molds (not shown) for forming the first, second, and third frames 191, 192, and 193 can have relatively simple structures. Thus, the molds can easily be manufactured, and manufacturing costs can be reduced. If the frame 190 is divided into two regions (parts), molds having relatively complex structures can be used, and thus costs for manufacturing the molds can be increased.

The first frame 191 can cover the first side S1 from which the lead members 170 extend outward. The first frame 191 can include tab holes 191' to receive the lead members 170. The first frame 191 can fix the lead members 170 in place while preventing the lead members 170 having a thin thickness from swaying. That is, the first frame 191 can protect the lead members 170. In addition, due to the first frame 191, the lead members 170 may not be thermally damaged during a welding process.

The first frame 191 can be in contact with or can be close to the first side S1. The first frame 191 can extend to the third and fourth sides S3 and S4 across the first side S1. The first frame 191 can neighbor the third frames 193 along the third and fourth sides S3 and S4.

The third and fourth sides S3 and S4 can have the curved surfaces R1 as described above, and inner surfaces of the first frame 191 facing the third and fourth sides S3 and S4 can have has an accommodating or corresponding curved surfaces R2 facing the curved surfaces R1 and accommodating the curved surface R1. The curved surfaces R2 of the first frame 191 can contact the third and fourth sides S3 and S4 or can hold the third and fourth sides S3 and S4 from positions adjacent to the third and fourth sides S3 and S4. The first frame 191 and the third frames 193 can have curved surfaces R2 facing the curved surfaces R1 of the third and fourth sides S3 and S4 and an accommodating or corresponding the curved surfaces R1 of the third and fourth sides S3 and S4. The curved surfaces R2 of the first frame 191 and the third frames 193 can have substantially the same shape.

Gaps (g) (refer to FIG. 2) can be formed between the first frame 191 and the third frames 193. Due to the gaps (g), assembly tolerance can be managed when the frame 190 is coupled to the electrode assembly 150. For example, if the first frame 191 and the third frames 193 are assembled to be in contact with each other, and the electrode assembly 150 has a relatively short length due to process errors, the first frame 191 may not be located at a position close to the electrode assembly 150. That is, the first frame 191 can be located away from the electrode assembly 150.

The second frame 192 can cover the second side S2 opposite the lead members 170. The second frame 192 can be in contact with or can be close to the second side S2. The second frame 192 can extend to the third and fourth sides S3 and S4 across the second side S2. The second frame 192 can neighbor the third frames 193 along the third and fourth sides S3 and S4.

The third and fourth sides S3 and S4 can have the curved surfaces R1 as described above, and inner surfaces of the second frame 192 facing the third and fourth sides S3 and S4 can have an accommodating or corresponding curved surfaces R2 facing the curved surfaces R1 and accommodating the curved surfaces R1. The curved surfaces R2 of the second frame 192 can be in contact with the third and fourth sides S3 and S4 or can hold the third and fourth sides S3 and S4 from positions adjacent to the third and fourth sides S3 and S4. The curved surfaces R2 of the second frame 192 and the third frames 193 can face the curved surfaces R1 of the third and fourth sides S3 and S4 and can have a shape accommodating the shape of the curved surfaces R1 of the third and fourth sides S3 and S4. The curved surfaces R2 of the second frame 192 and the third frames 193 can have substantially the same shape.

Gaps (g) (refer to FIG. 2) can be formed between the second frame 192 and the third frames 193. Due to the gaps (g), assembly tolerance can be managed when the frame 190 is coupled to the electrode assembly 150. For example, if the second and third frames 192 and 193 are assembled to be in contact with each other, and the electrode assembly 150 has a relatively short length due to process errors, the second frame 192 may not be located at a position close to the electrode assembly 150. That is, the second frame 192 can be located away from the electrode assembly 150.

The first frame 191 can be spaced apart from the third frames 193 by the gaps (g) (refer to FIG. 2), and the second frame 192 can be spaced apart from the third frames 193 by the gaps (g) (refer to FIG. 2). However, according to the positions of the third frames 193, gaps (g) can be formed between the first and third frames 191 and 193 and/or between the second and third frames 192 and 193 (refer to FIG. 2). The total length of the first, second, and third frames 191, 192, and 193, that is, the length of the frame 190 extending in the direction in which the lead members 170 extend outward, can be smaller than the length of the electrode assembly 150, and in this case, the gaps (g) between the first and third frames 191 and 193 or between the second and third frames 192 and 193 can compensate for assembly errors of the electrode assembly 150.

The third frames 193 can cover the third and fourth sides S3 and S4. The third frames 193 can be provided as a pair and separate from each other. The paired third frames 193 can respectively cover the third and fourth sides S3 and S4. Alternatively, the paired third frames 193 may not be separate from each other for efficiency in an assembly process. In the exemplary embodiment, as long as the third frames 193 fill a space between the case 110 and the third and fourth sides S3 and S4, the third frames 193 can be provided as a pair separate from each other or connected to each other.

The third and fourth sides S3 and S4 can have the curved surfaces R1 as described above, and inner surfaces of the third frames 193 facing the third and fourth sides S3 and S4 can have accommodating or corresponding curved surfaces R2 facing the curved surfaces R1 and accommodating the curved surfaces R1. The curved surfaces R2 of the third frames 193 can have the same shape as the curved surfaces R2 of the first and second frames 191 and 192, and the curved surfaces R2 of the third frames 193 and the first and second frames 191 and 192 can hold the third and fourth sides S3 and S4 while covering the third and fourth sides S3 and S4.

Figure 6:
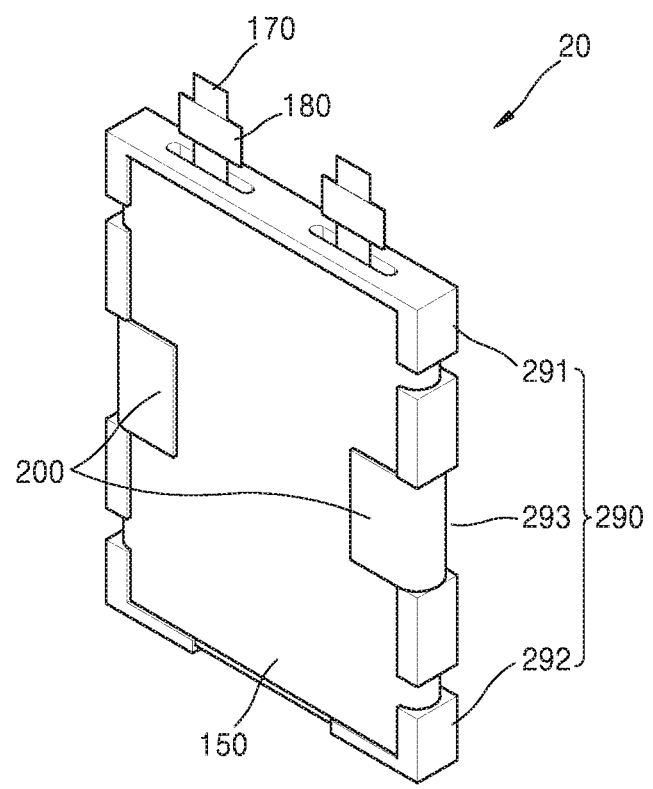
FIGS. 6 and 7 are views illustrating a secondary battery according to another exemplary embodiment.
Figure 7:
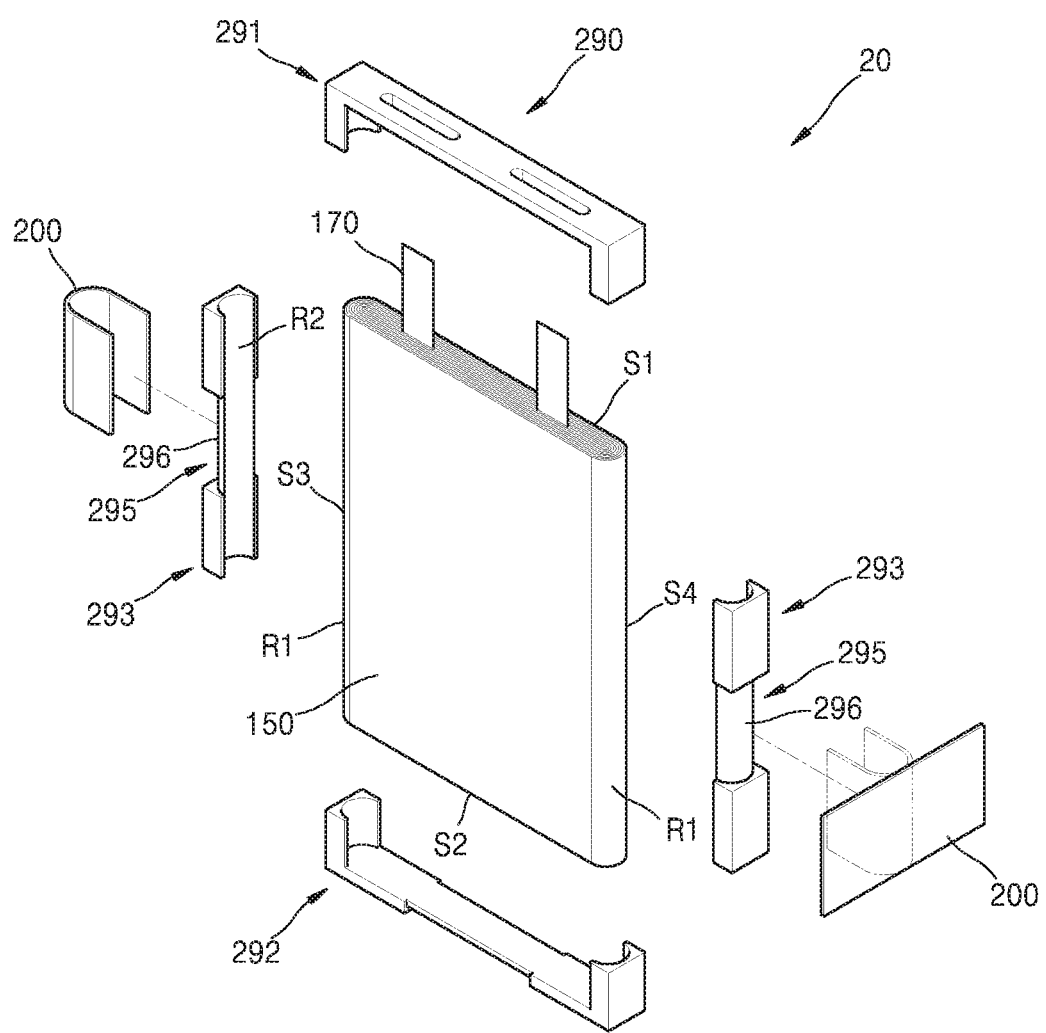

FIGS. 6 and 7 are views illustrating a secondary battery 20 according to another exemplary embodiment.

Referring to FIGS. 6 and 7, the secondary battery 20 includes an electrode assembly 150 and a frame 290 surrounding the electrode assembly 150. Like in the exemplary embodiment shown in FIG. 1, the secondary battery 20 can further include a case (not shown) to accommodate the electrode assembly 150, and the frame 290 can be disposed between the electrode assembly 150 and the case (not shown).

The frame 290 fills a space between the electrode assembly 150 and the case so as to prevent the electrode assembly 150 from wobbling and suppress deformation of the case. In addition, since the frame 290 fills the space between the electrode assembly 150 and the case, the case can be filled with a relatively small amount of electrolyte.

Fixing members 200 can be disposed on the frame 290. The fixing members 200 can surround the frame 290 and the electrode assembly 150, and thus the frame 290 can be fixed. For example, the fixing members 200 are attached to the frame 290 surrounding the electrode assembly 150 and surround the frame 290 and sides of the electrode assembly 150 so as to fix the frame 290. The fixing members 200 can include adhesive tape.

The fixing members 200 can be disposed on portions of the frame 290 that surround a center region of the electrode assembly 150. For example, the fixing members 200 are disposed on third frames 293 that surround a center region of the electrode assembly 150. A pair of fixing members 200 can be provided to a pair of third frames 293. The frame 290 can be divided into three regions: first, second, and third frames 291, 292, and 293. In this case, the first and second frames 291 and 292 can be coupled to the electrode assembly 150 by inserting first and second sides S1 and S2 into the first and second frames 291 and 292, and thus the first and second frames 291 and 292 can be relatively stably fixed. However, since the third frames 293 are simply added to third and fourth sides S3 and S4, the third frames 293 may not be stably fixed. Thus, the fixing members 200 can surround the third frames 293 to firmly fix the third frames 293.

The fixing members 200 can surround the frame 290 and sides of the electrode assembly 150. For example, the fixing members 200 are disposed on the third frames 293 surrounding the third and fourth sides S3 and S4. For example, the fixing members 200 not be disposed on the first side S1 from which lead members 170 extend outward or the second side S2 located opposite the first side S1. If the fixing members 200 are disposed on the first and second sides S1 and S2, the lead members 170 not easily extend outward.

Figure 8:
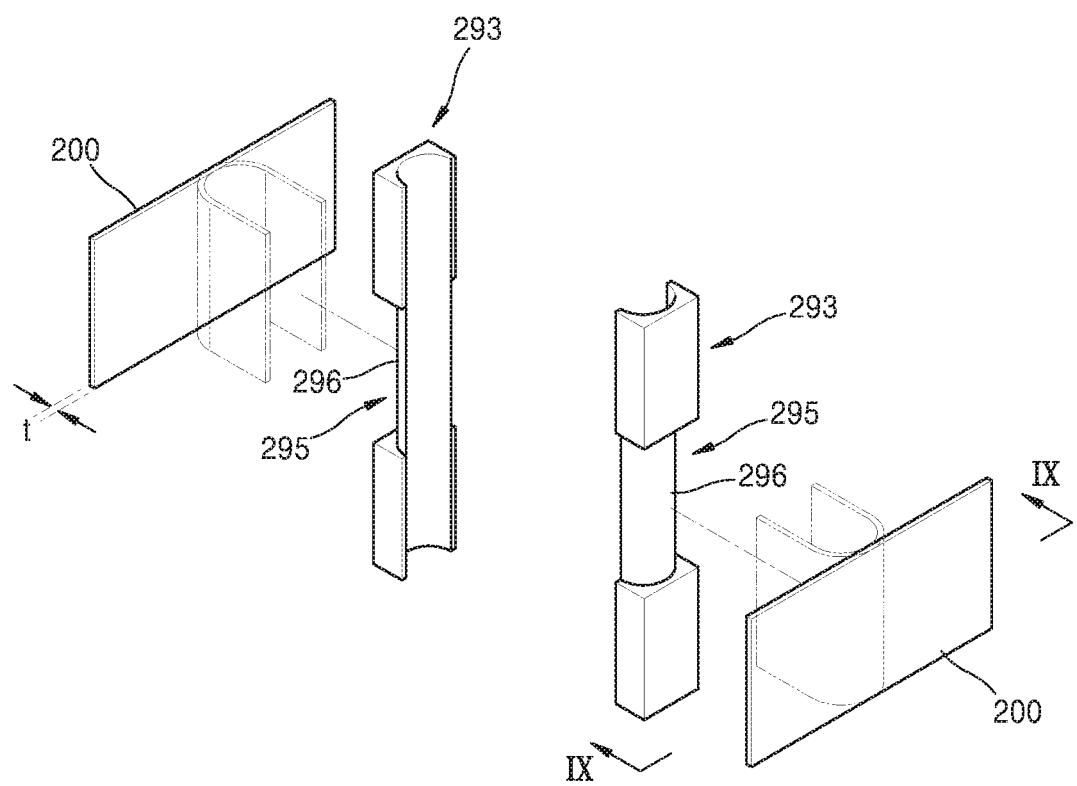
FIG. 8 is a view illustrating installation depressions formed for installation of fixing members.
Figure 9:
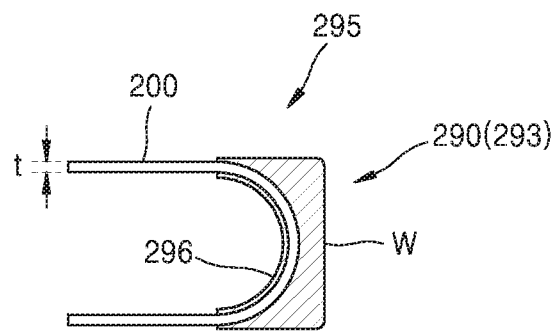
FIG. 9 is a cross-sectional view taken along line IX-IX of FIG. 8.

FIG. 8 illustrates installation depressions 295 provided for the fixing members 200. FIG. 9 is a cross-sectional view taken along line IX-IX of FIG. 8.

Referring to FIGS. 8 and 9, the installation depressions 295 can be formed on portions of the frame 290 along which the fixing members 200 will be folded. The installation depressions 295 can guide the fixing members 200. For example, the thickness (t) of the fixing members 200 not be seen from the outside of the frame 290 due to the installation depressions 295. That is, the installation depressions 295 can be formed by recessing the frame 290 by an amount at least corresponding to the thickness (t) of the fixing members 200, and thus the fixing members 200 may not protrude outward from the frame 290. Due to the installation depressions 295, the size of the secondary battery may not be increased even though the fixing members 200 are used, and thus the packing ratio of the secondary battery may not be lower than that of a secondary battery having substantially the same capacity. Referring to FIG. 9, the depth of the installation depressions 295 can be substantially equal to or greater than the thickness (t) of the fixing members 200. For example, the installation depressions 295 can be formed by recessing walls (w) of the frame 290 by an amount substantially equal to or greater than the thickness (t) of the fixing members 200.

The installation depressions 295 can include rest parts 296 on which the fixing members 200 are placed. For example, the rest parts 296 can be rounded in directions in which the fixing members 200 are folded. Due to the rest parts 296 having a smooth round shape, the fixing members 200 may not be damaged by sharp edges and can easily be folded along the smooth round shape of the rest parts 296.

The rest parts 296 can be formed on the third frames 293 covering the third and fourth sides S3 and S4. For example, a pair of rest parts 296 can be formed on the third frames 293 covering the third and fourth sides S3 and S4. For example, the installation depressions 295 may are provided as a pair formed at opposite positions of the paired third frames 293 such as central opposite positions of the paired third frames 293.

Figure 10:
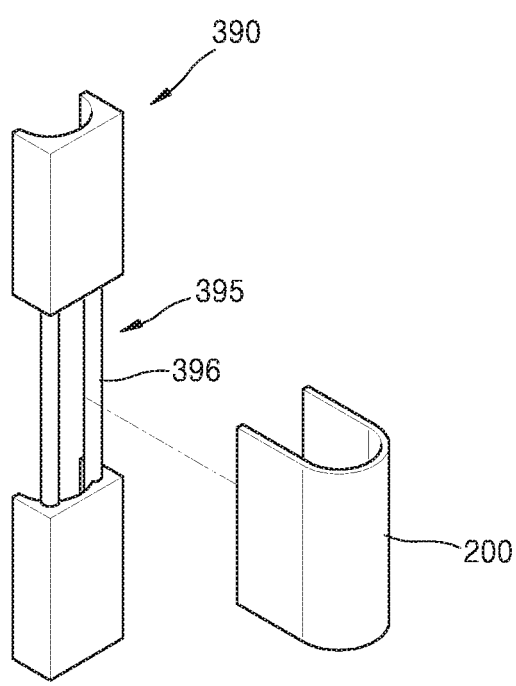
FIG. 10 is a view illustrating an installation depression according to another exemplary embodiment.

FIG. 10 is a view illustrating an installation depression 395 according to another exemplary embodiment.

Referring to FIG. 10, the installation depression 395 canis formed on a frame 390 along which a fixing member 200 will be folded. Due to the installation depression 395, the thicknesses of the fixing member 200 may not be seen from the outside of the frame 390. For example, due to the installation depression 395, the size of a secondary battery may not be increased by the thickness of the fixing member 200, and the fixing member 200 can be protected because the fixing member 200 does not protrude outward from the frame 390.

The installation depression 395 can include a rest part 396 on which the fixing member 200 is placed. The rest part 396 can have a round bar shape. For example, the rest part 396 can include two parallel round bars separate from each other. Due to the rest part 396 having a smooth round shape, the fixing member 200 may not be damaged by sharp edges and can easily be folded along the smooth round shape of the rest part 396.

According to at least one of the disclosed embodiments, wobbling of the electrode assembly can be prevented, and the case accommodating the electrode assembly may not be wrinkled, torn, chopped, stabbed or damaged.

In addition, the amount of electrolyte in the case can be reduced, and thus the manufacturing costs of the secondary battery can be decreased.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details can be made therein without departing from the spirit and scope as defined by the following claims.

What is claimed is:

1. A secondary battery comprising: an electrode assembly comprising a curved surface on at least one side thereof; a frame surrounding the electrode assembly and comprising an accommodating curved surface facing the curved surface of the electrode assembly; and a case accommodating the electrode assembly and the frame to form the secondary battery, wherein the frame is disposed inside the case of the secondary battery, wherein the electrode assembly comprises: a first side from which a lead member extends outwardly; and a second side opposite the first side, third and fourth sides extending in parallel with each other to cross the first and second sides, wherein the frame comprises a first frame covering the first side of the electrode assembly, a second frame covering the second side of the electrode assembly, and a pair of third frames respectively covering the third and fourth sides of the electrode assembly, wherein inner surfaces of the first and second frames facing the first and second sides of the electrode assembly have flat surfaces, respectively, wherein the frame further comprises a plurality of rest parts wherein the secondary battery further comprises a plurality of fixing members folded along the plurality of rest parts and surrounding the plurality of rest parts and portions of the electrode assembly, and wherein the plurality of fixing members are directly attached to the electrode assembly and extend in a direction crossing the third frames.

2. The secondary battery of claim 1,
wherein the third and fourth sides comprise curved surfaces, and
wherein the frame covers the curved surfaces of the third and fourth sides.

3. The secondary battery of claim 2, wherein the electrode assembly has a substantially rectangular shape, and wherein the third and fourth sides are longer than the first and second sides.

4. The secondary battery of claim 1, wherein the first frame has a tab hole through which the lead member passes.

5. The secondary battery of claim 1, wherein the first frame extends to the third and fourth sides of the electrode assembly across the first side of the electrode assembly, and wherein the first frame neighbors the third frames along the third and fourth sides of the electrode assembly.

6. The secondary battery of claim 5, wherein the second frame extends to the third and fourth sides of the electrode assembly across the second side of the electrode assembly, and wherein the second frame neighbors the third frames along the third and fourth sides of the electrode assembly.

7. The secondary battery of claim 1, wherein i) the first frame is spaced apart from the third frame and/or ii) the second frame is spaced apart from the third frame.

8. The secondary battery of claim 1, wherein the third frames are separate from each other.

9. The secondary battery of claim 1, wherein the case comprises a flexible pouch.

10. The secondary battery of claim 1, wherein the electrode assembly further comprises:
first and second main surfaces larger than and surrounded by the first, second, third and fourth sides,
wherein each of the first, second and third frames includes a curved inner surface that covers 1) different portions of the curved surfaces of the third and fourth sides of the electrode assembly and 2) different portions of the main surfaces of the electrode assembly.

11. A secondary battery comprising: an electrode assembly comprising a first side from which a lead member extends outwardly, a second side opposite the first side, and third and fourth sides extending in parallel with each other to cross the first and second sides; a frame surrounding the electrode assembly and comprising a plurality of rest parts, wherein the frame comprises a first frame covering the first side of the electrode assembly, a second frame covering the second side of the electrode assembly, and a pair of third frames respectively covering the third and fourth sides of the electrode assembly, and wherein inner surfaces of the first and second frames facing the first and second sides of the electrode assembly have flat surfaces, respectively; a plurality of fixing members folded along the plurality of rest parts and surrounding the plurality of rest parts and portions of the electrode assembly, wherein the plurality of fixing members are directly attached to the electrode assembly and extend in a direction crossing the third frames; and a case accommodating the electrode assembly and the frame to form the secondary battery, wherein the frame is disposed inside the case of the secondary battery.

12. The secondary battery of claim 11, wherein the thicknesses of the plurality of rest parts are substantially equal to or greater than the thicknesses of the plurality of fixing members.

13. The secondary battery of claim 11, wherein the plurality of rest parts have a curved shape, and wherein the plurality of fixing members are folded around the plurality of rest parts.

14. The secondary battery of claim 11, wherein the frame includes a plurality of portions covering the third and fourth sides, and wherein the plurality of fixing members are folded around the plurality of portions of the frame.

15. The secondary battery of claim 14, wherein the electrode assembly has a substantially rectangular shape, and wherein the third and fourth sides are longer than the first and second sides.

16. The secondary battery of claim 11, wherein the electrode assembly further comprises:
first and second main surfaces larger than and surrounded by the first, second, third and fourth sides,
wherein each of the first, second and third frames includes a curved inner surface that covers 1) different portions of the curved surfaces of the third and fourth sides of the electrode assembly and 2) different portions of the main surfaces of the electrode assembly.

* * * * *